United States Patent
Melone

(10) Patent No.: US 11,750,037 B2
(45) Date of Patent: Sep. 5, 2023

(54) DYNAMIC OPERATION ADJUSTMENT IN WIRELESS POWER TRANSFER SYSTEM

(71) Applicant: NuCurrent, Inc., Chicago, IL (US)

(72) Inventor: Mark Melone, Frankfort, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 17/354,523

(22) Filed: Jun. 22, 2021

(65) Prior Publication Data
US 2022/0407363 A1    Dec. 22, 2022

(51) Int. Cl.
| | | |
|---|---|---|
| *H02J 50/20* | (2016.01) | |
| *H02J 50/80* | (2016.01) | |
| *H02J 50/12* | (2016.01) | |
| *H04B 1/16* | (2006.01) | |
| *H04B 5/00* | (2006.01) | |

(Continued)

(52) U.S. Cl.
CPC .............. *H02J 50/20* (2016.02); *H02J 50/12* (2016.02); *H02J 50/80* (2016.02); *H04B 1/16* (2013.01); *H04B 5/0037* (2013.01); *H04B 5/0081* (2013.01); *H02J 50/60* (2016.02); *H02J 50/90* (2016.02)

(58) Field of Classification Search
CPC .. H02J 50/20; H02J 50/12; H02J 50/80; H02J 50/60; H02J 50/90; H04B 1/16; H04B 5/0037; H04B 5/0081
See application file for complete search history.

(56) References Cited

U.S. PATENT DOCUMENTS

| | | | |
|---|---|---|---|
| 7,456,600 B1* | 11/2008 | Yoshino | H02P 23/0077 318/729 |
| 10,023,138 B1* | 7/2018 | Lurie | B60R 16/0231 |
| 2010/0189196 A1 | 7/2010 | Wang et al. | |

(Continued)

FOREIGN PATENT DOCUMENTS

WO    2018163170 A1    9/2018

OTHER PUBLICATIONS

International Searching Authority, PCT International Search Report and Written Opinion, PCT International Application No. PCT/US2022/034612 dated Oct. 20, 2022, 10 pages.

*Primary Examiner* — Jared Fureman
*Assistant Examiner* — Joel Barnett
(74) *Attorney, Agent, or Firm* — Lee Sullivan Shea & Smith LLP

(57) ABSTRACT

A wireless power transfer system is provided having a wireless transmission system that includes an input to receive input power from an input power source, a transmission antenna, and a transmission controller configured to generate wireless signals based, at least in part, on the input power, the wireless signals including wireless power signals and wireless data signals, and to transmit such wireless signals. The wireless power transfer system further includes a wireless receiver system in a wireless peripheral device, the wireless receiver system having a receiver antenna configured to receive the wireless power signals and wireless data signals via inductive coupling with the transmission antenna, as well as a receiver controller configured to determine the acceleration of the wireless peripheral device, generate a prescribed update frequency based on the detected acceleration, and transmit operational updates to the wireless transmission system at the prescribed update frequency.

20 Claims, 11 Drawing Sheets

(51) Int. Cl.
*H02J 50/90* (2016.01)
*H02J 50/60* (2016.01)

(56) References Cited

U.S. PATENT DOCUMENTS

| | | |
|---|---|---|
| 2011/0089769 A1 | 4/2011 | Kwon et al. |
| 2013/0207917 A1* | 8/2013 | Cruz-Hernandez ..... G06F 3/016 345/173 |
| 2013/0210460 A1* | 8/2013 | Subramanian ...... B61L 15/0027 455/456.3 |
| 2014/0225451 A1* | 8/2014 | Lafontaine .............. H02J 7/007 307/104 |
| 2014/0292566 A1* | 10/2014 | Park ........................ H04W 4/02 342/357.2 |
| 2015/0015198 A1* | 1/2015 | Okada ..................... H02J 50/70 320/108 |
| 2016/0013658 A1 | 1/2016 | Kohara et al. |
| 2017/0093197 A1 | 3/2017 | Gao et al. |
| 2020/0220707 A1* | 7/2020 | Jeong ................. G06K 19/0723 |
| 2020/0249372 A1 | 8/2020 | Thomas et al. |
| 2020/0251929 A1* | 8/2020 | Partovi ................... H01F 5/003 |

\* cited by examiner

DYNAMIC OPERATION ADJUSTMENT IN WIRELESS POWER TRANSFER SYSTEM

TECHNICAL FIELD

The present disclosure generally relates to systems and methods for wireless transfer of electrical power and/or electrical data signals, and, more particularly, to a wireless power transfer system capable of dynamically adjusting its operation in response to coupling with a wireless power receiver associated with a peripheral device.

BACKGROUND

Wireless connection systems are used in a variety of applications for the wireless transfer of electrical energy, electrical power, electromagnetic energy, electrical data signals, among other known wirelessly transmittable signals. Such systems often use inductive and/or resonant inductive wireless power transfer, which occurs when magnetic fields created by a transmitting element induce an electric field and, hence, an electric current, in a receiving element. These transmitting and receiving elements will often take the form of coiled wires and/or antennas.

Transmission of one or more of electrical energy, electrical power, electromagnetic energy and/or electronic data signals from one of such coiled antennas to another, generally, is executed at an operating frequency and/or over an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

One or more endpoints of a system for wireless power and data transfer may be in motion during ordinary use. During wireless power and data transfer within such a system, the coupling between the transmitter and receiver antennae may degrade, resulting not only in power loss, but also data loss. Examples of such systems include wirelessly charged peripherals such as pointers, mice, sensors and so on.

SUMMARY

In some example applications for wireless power transfer, it is desired to power and/or charge an electronic device, such as a peripheral device via a use surface such as a mouse pad or other nearby element. Although such charging has been attempted in various systems, such systems tend to manage charging transmission power poorly, leading to power waste and excess heat generation. However, using the systems, methods, and apparatus disclosed herein may allow for much more efficient operation and greater device longevity by managing power based on coupling, thereby providing sufficient power without losing coupling or wasting excess power.

In particular, dynamically changing the frequency of coupling change data from the peripheral receiver system, based on peripheral device movement, enables the wireless transmitter system to optimize transmission power in real-time. This ability is especially valuable in circumstances that entail very frequent relative movement of the peripheral device, because in the absence of such frequent updates, the transmitter system may be required to operate at a higher transmission power than is appropriate even in highly coupled configurations in order to ensure sufficient power transmission at the extremes of the movement range. This manner of operation may not only waste electrical power but also may overwork components such as diodes wherein that wasted energy is converted to heat. This in turn may cause operation interruptions due to exceeding thermal limits and/or may cause premature thermal wear in the affected system components.

In accordance with one aspect of the disclosure, a wireless power transfer system is disclosed having a wireless transmission system that includes an input to receive input power from an input power source, a transmission antenna, and a transmission controller configured to generate wireless signals based, at least in part, on the input power, the wireless signals including wireless power signals and wireless data signals, and to transmit such wireless signals at a transmit power. In this aspect, the wireless power transfer system further includes a wireless receiver system in a wireless peripheral device, the wireless receiver system having a receiver antenna configured to receive the wireless power signals and wireless data signals via inductive coupling with the transmission antenna as well as a receiver controller configured to determine the acceleration of the wireless peripheral device, generate a prescribed update frequency based on the detected acceleration, and transmit operational updates to the wireless transmission system at the prescribed update frequency.

In a refinement, the peripheral device includes one or more of a computer input device, a mouse, a keyboard, a tablet computer, a mobile device, an audio device, a headset, headphones, earbuds, a remote control, a recording device, a conference telephonic device, a microphone, a gaming controller, a camera, a stylus, electronic eyewear, or combinations thereof.

In a further refinement the wireless transmission system is configured to directly power the peripheral device, and in an alternate refinement the wireless transmission system is configured to provide electrical power to a load of an electronic device operatively associated with the wireless receiver system, wherein the load is an electrical energy storage device of the peripheral device.

In yet another refinement, the transmission controller is further configured to provide driving signals for driving the transmission antenna, and the wireless power transfer system further includes a power conditioning system configured to receive the driving signals and generate the wireless signals based, at least in part, on the driving signal.

In another refinement, the wireless power transfer system further includes a demodulation circuit configured to receive communications signals from the wireless receiver system and decode the communications signals by determining a rate of change in electrical characteristics of the communications signals.

In an additional refinement, the transmission antenna is configured to operate based on an operating frequency of about 6.78 MHz.

Moreover, in another refinement, the transmission controller is configured to generate the prescribed update frequency based on the detected acceleration by mapping the detected acceleration to the prescribed update frequency based on a predetermined map.

In accordance with another aspect of the disclosure, a method of wireless power transfer between a wireless transmission system having a transmission antenna and a peripheral device with a wireless receiver system having a receiving antenna is provide. The method includes generating wireless signals including wireless power signals and wireless data signals, transmitting the wireless signals to the receiver antenna via the transmission antenna to provide power and data to the peripheral device, detecting acceleration of the peripheral device at the wireless receiver system, generating an update frequency based on the detected acceleration of the peripheral device, and transmitting operational updates from the wireless receiver system to the wireless transmission system via the receiving antenna and the transmission antenna at the generated update frequency.

In a refinement, the peripheral device includes one or more of a computer input device, a mouse, a keyboard, a tablet computer, a mobile device, an audio device, a headset, headphones, earbuds, a remote control, a recording device, a conference telephonic device, a microphone, a gaming controller, a camera, a stylus, electronic eyewear, or combinations thereof.

In another refinement, the wireless signals directly power the peripheral device and in an alternative refinement, the wireless signals provide electrical power to a load of an electronic device operatively associated with the wireless receiver system, wherein the load is an electrical energy storage device of the peripheral device.

In yet another refinement, generating wireless signals further comprises generating driving signals for driving the transmission antenna, and conditioning the driving signals to generate the wireless signals based, at least in part, on the driving signal.

Moreover, another refinement provides that generating the wireless signals further comprises encoding the wireless data signals in the wireless signals as modulations in the wireless signals.

In a further refinement, the transmission antenna is configured to operate based on an operating frequency of about 6.78 MHz.

In a refinement, generating an update frequency based on the detected acceleration of the peripheral device further comprises mapping the detected acceleration of the peripheral device to the update frequency based on a predetermined map.

In accordance with another aspect of the disclosure a wireless power transfer system is provided having a wireless transmission system in a surface supporting a peripheral device, the wireless transmission system being configured to transmit power and data via inductive coupling. The wireless power transfer system also includes a wireless receiver system within the peripheral device configured to inductively couple with the wireless transmission system to receive the transmitted power and data, detect acceleration of the peripheral device, generate an update frequency based on the detected acceleration of the peripheral device, and transmit operational updates to the wireless transmission system at the generated update frequency via the inductive coupling.

In a refinement, the wireless receiver system is configured to use the transmitted power to either directly power the peripheral device or provide power to an electrical energy storage device of the peripheral device.

In a further refinement, the wireless transmission system is configured to operate at an operating frequency of about 6.78 MHz.

In yet another refinement, the wireless transmission system is configured to generate the update frequency based on the detected acceleration of the peripheral device by mapping the detected acceleration to the update frequency based on a predetermined map.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
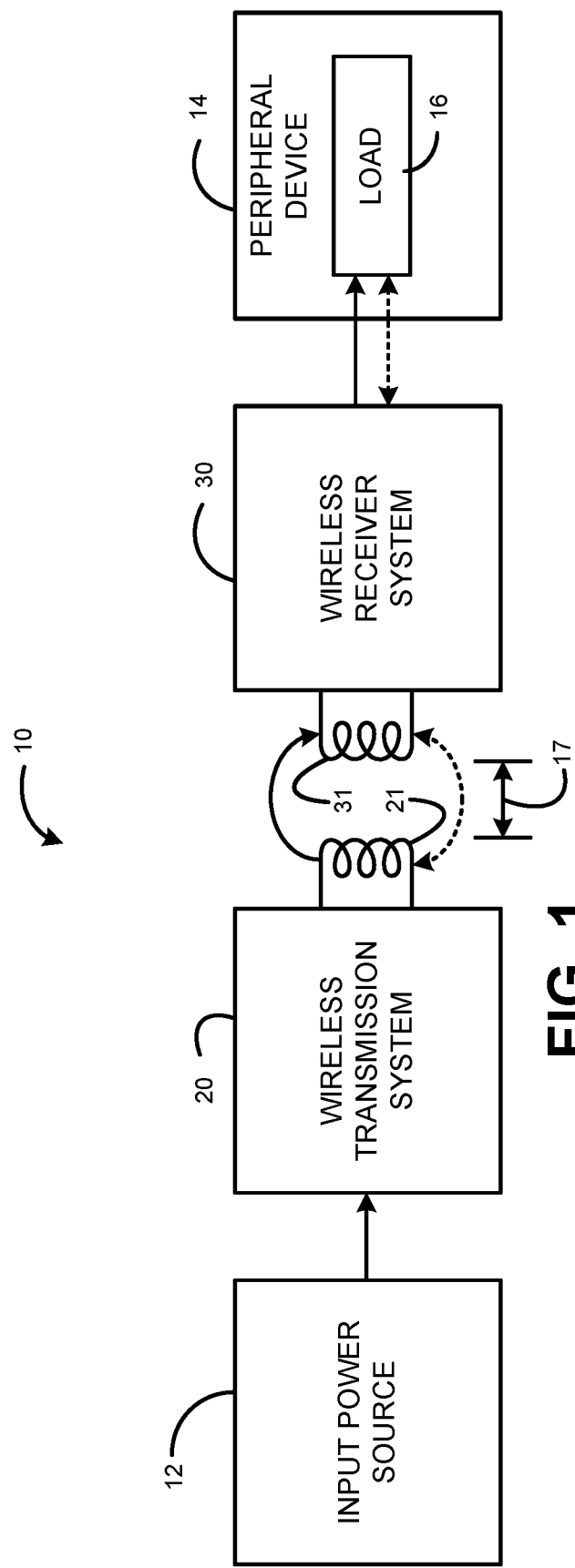
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes one or more wireless transmission systems 20 and one or more wireless receiver systems 30. A wireless receiver system 30 is configured to receive electrical signals from, at least, a wireless transmission system 20.

As illustrated, the wireless transmission system 20 and wireless receiver system 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of a wireless transmission system 20 and wireless receiver system 30 creates an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

While FIG. 1 may depict wireless power signals and wireless data signals transferring only from one antenna (e.g., transmission antenna 21) to another antenna (e.g., receiver antenna 31), it is certainly possible that a transmitting antenna 21 may transfer electrical signals and/or couple with one or more other antennas.

In some cases, the gap 17 may also be referenced as a "Z-Distance," because, if one considers each of antenna 21 and antenna 31 to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k); that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9. The coupling coefficient may change with changes in either the Z-Distance or the vertical registration of the antennae 21, 31.

Figure 3:
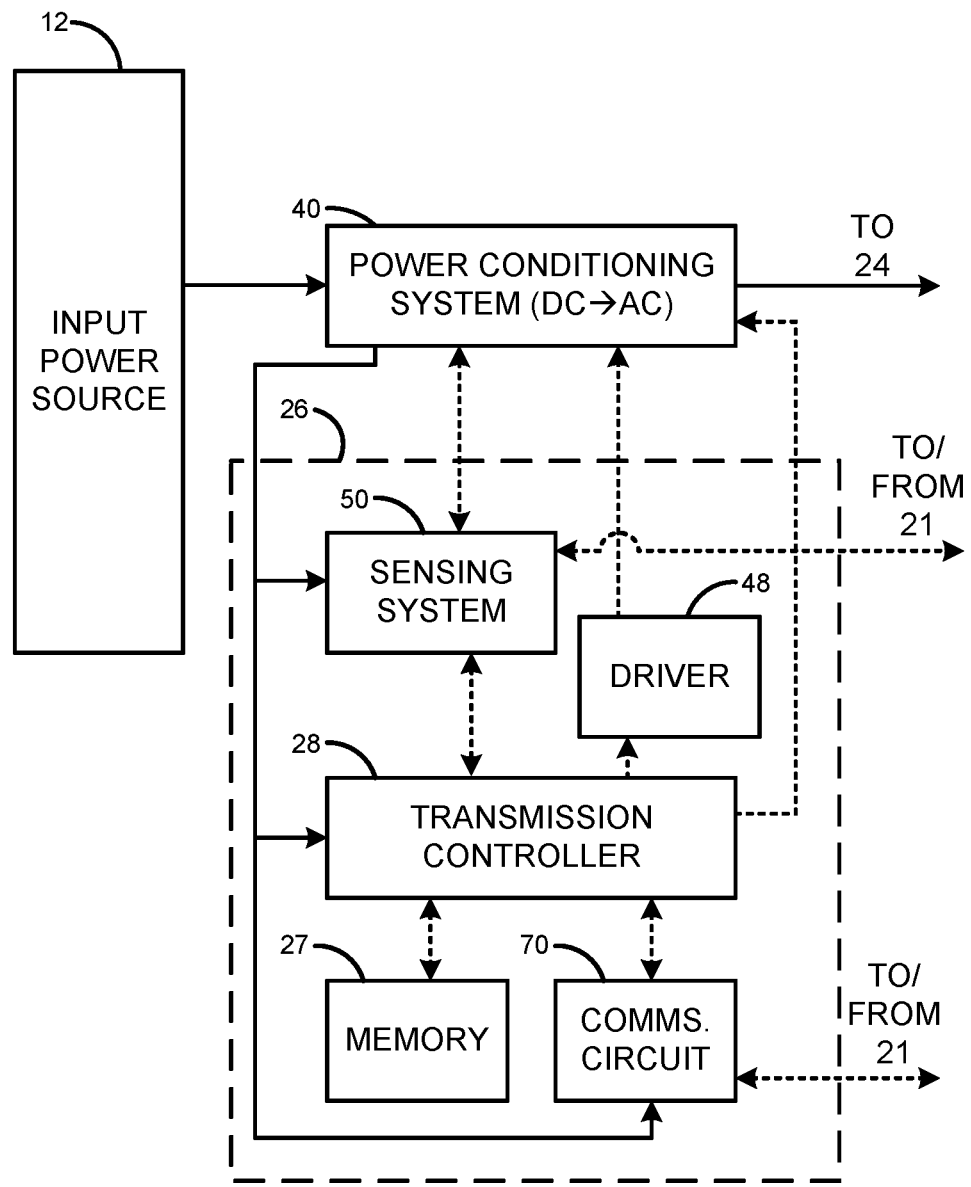
FIG. 3 is a block diagram illustrating components of a power conditioning system in accordance with the present disclosure.

As illustrated in FIG. 3, at least the wireless transmission system 20 is associated with an input power source 12. The input power source 12 may be operatively associated with a host device such as a desktop or laptop computer or other electrically operated device, circuit board, electronic assembly, dedicated charging device, or any other contemplated electronic device. Example host devices, with which the wireless transmission system 20 may be associated include, but are not limited to including, a device that includes an integrated circuit, a portable computing device, storage medium for electronic devices, charging apparatus for one or multiple electronic devices, dedicated electrical charging devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is used for at least two purposes: to provide electrical power to internal components of the wireless transmission system 20 and to provide electrical power to the transmission antenna 21. The transmission antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmission antenna 21 and the receiving antenna 31 of, or associated with, the wireless receiver system 30. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmission antenna 21 or the receiver antenna 31 are strategically positioned to facilitate reception and/or transmission of wirelessly transferred electrical signals through near field magnetic induction. As such, movement of either device from that position may require retuning of the circuit operating parameters to re-optimize coupling.

Antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer.

The transmitting antenna 21 and receiving antenna 31 of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one peripheral device 14, wherein the peripheral device 14 may be any device providing input and/or output to a computing device, that requires electrical power for any function and/or for power storage (e.g., via a battery and/or capacitor). Additionally, the peripheral device 14 may be any peripheral device capable of receipt of electronically transmissible data. For example, the peripheral device 14 may be, but is not limited to being, a computer input device, a mouse, a keyboard, an audio device, a headset, headphones, earbuds, a recording device, a conference telephonic device, a microphone, an electronic stylus, a handheld computing device, a mobile device, an electronic tool, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Except as otherwise indicated, solid lines indicate signal transmission of electrical energy over a physical and/or wireless power transfer, in the form of power signals that are, ultimately, utilized in wireless power transmission from the wireless transmission system 20 to the wireless receiver system 30. Further, except as otherwise indicated, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
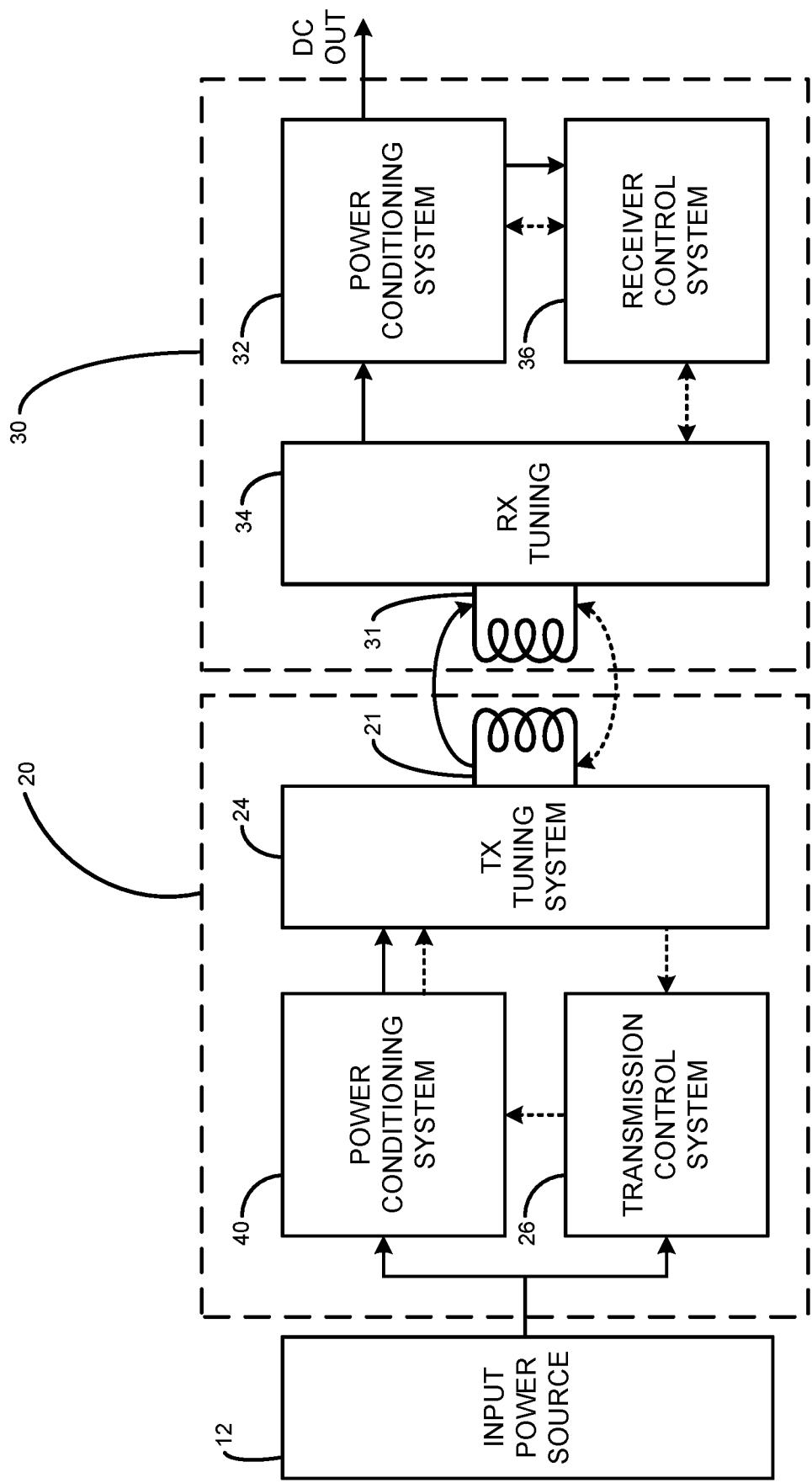
FIG. 2 is a block diagram illustrating components of the wireless transmission system and wireless receiver system of FIG. 1 in accordance with the present disclosure.

Turning now to FIG. 2, the wireless power transfer system 10 is illustrated as a block diagram including example sub-systems of both the wireless transmission systems 20 and the wireless receiver systems 30. The wireless transmission systems 20 may include, at least, a power conditioning system 40, a transmission control system 26, a transmission tuning system 24, and the transmission antenna 21. A first portion of the electrical energy input from the input power source 12 may be configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

The wireless receiver system 30 includes, at least, the receiver antenna 31, a receiver tuning and filtering system 34, a power conditioning system 32, a receiver control system 36, and a voltage isolation circuit 70. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmission antenna 20.

Referring now to FIG. 3, with continued reference to FIGS. 1 and 2, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
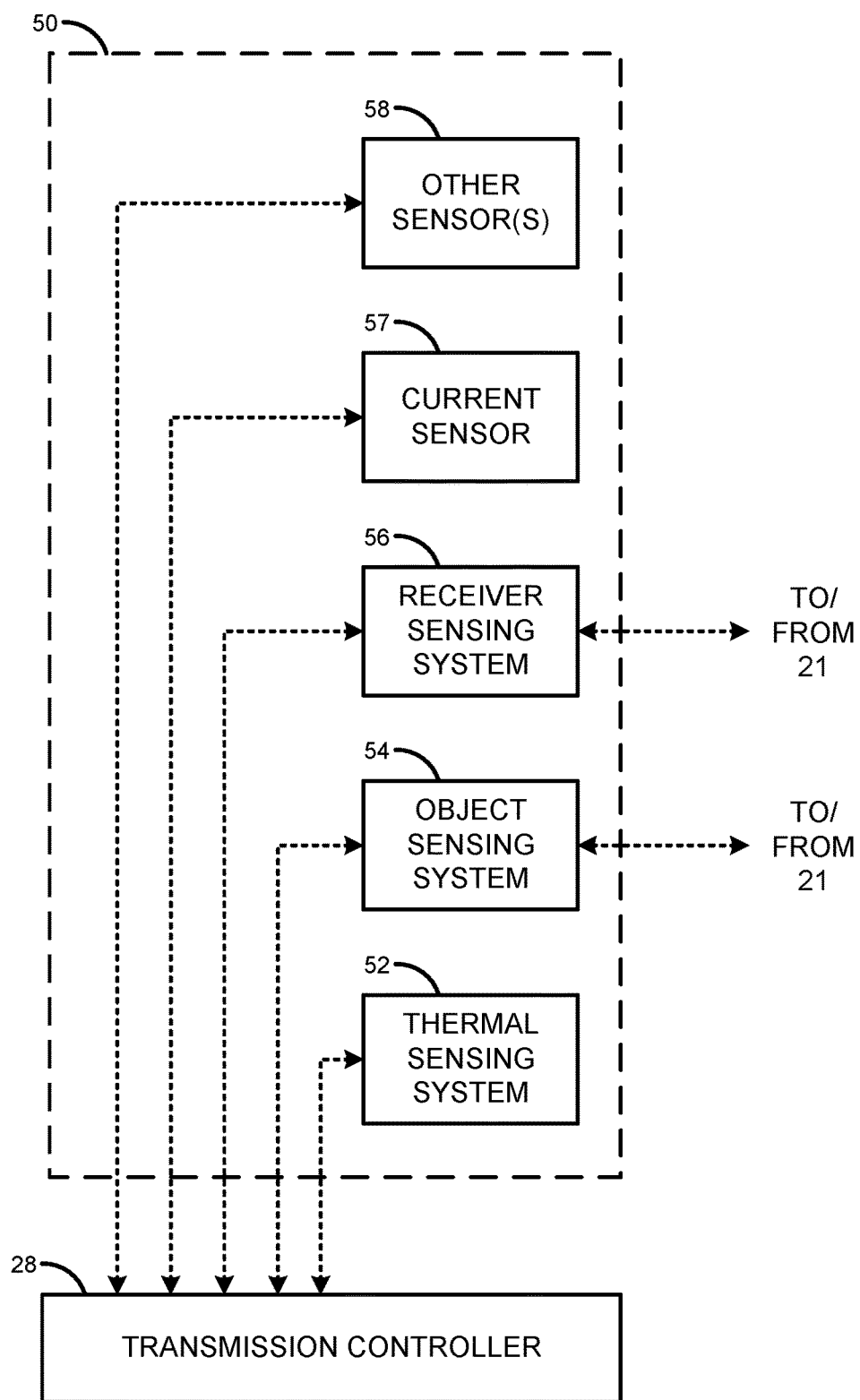
FIG. 4 is a block diagram illustrating components of a sensing system for transmission control in accordance with the present disclosure.

As illustrated in the embodiment of FIG. 4, the sensing system 50 may include, but is not limited to including, a thermal sensing system 52, an object sensing system 54, a receiver sensing system 56, a current sensor 57, and/or any other sensor 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56, the current sensor 57, and/or the other sensor 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof. In some examples, the quality factor measurements, described above, may be performed when the wireless power transfer system 10 is performing in band communications.

The receiver sensing system 56 is any sensor, circuit, and/or combinations thereof configured to detect the presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
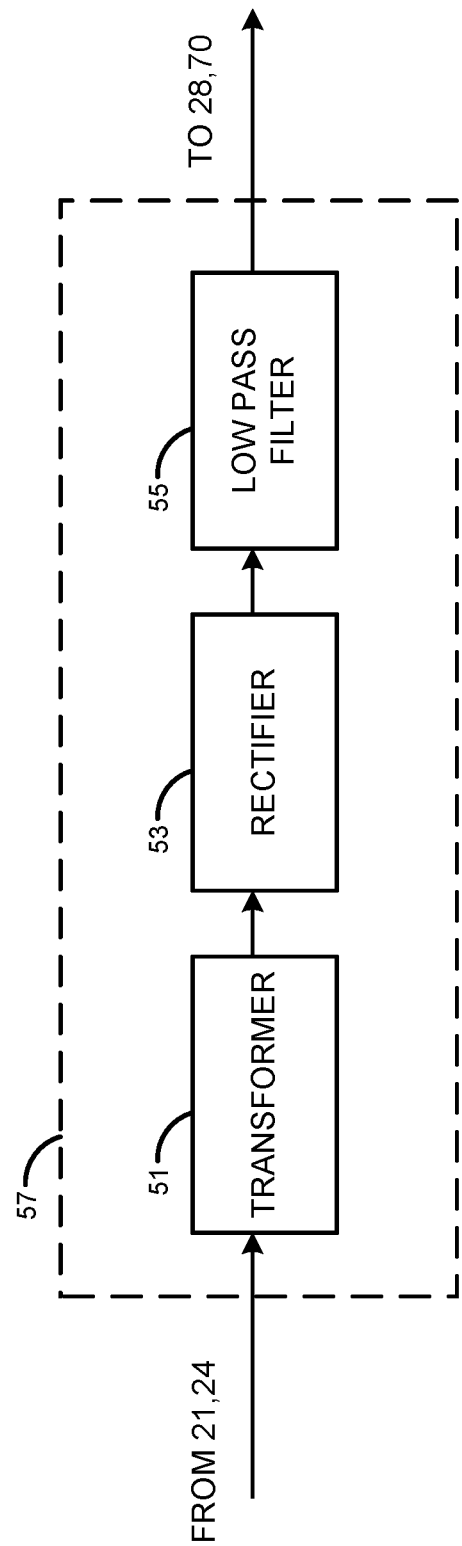
FIG. 5 is a block diagram for an example low pass filter of the sensing system of FIG. 4, in accordance with the present disclosure.

The current sensor 57 may be any sensor configured to determine electrical information from an electrical signal, such as a voltage or a current, based on a current reading at the current sensor 57. Components of an example current sensor 57 are further illustrated in FIG. 5, which is a block diagram for the current sensor 57. The current sensor 57 may include a transformer 51, a rectifier 53, and/or a low pass filter 55, to process the AC wireless signals, transferred via coupling between the wireless receiver system 20 and wireless transmission system 30, to determine or provide information to derive a current ($I_{Tx}$) or voltage ($V_{Tx}$) at the transmission antenna 21. The transformer 51 may receive the AC wireless signals and either step up or step down the voltage of the AC wireless signal, such that it can properly be processed by the current sensor. The rectifier 53 may receive the transformed AC wireless signal and rectify the signal, such that any negative remaining in the transformed AC wireless signal are either eliminated or converted to opposite positive voltages, to generate a rectified AC wireless signal. The low pass filter 55 is configured to receive the rectified AC wireless signal and filter out AC components (e.g., the operating or carrier frequency of the AC wireless signal) of the rectified AC wireless signal, such that a DC voltage is output for the current ($I_{Tx}$) and/or voltage ($V_{Tx}$) at the transmission antenna 21.

Figure 6:
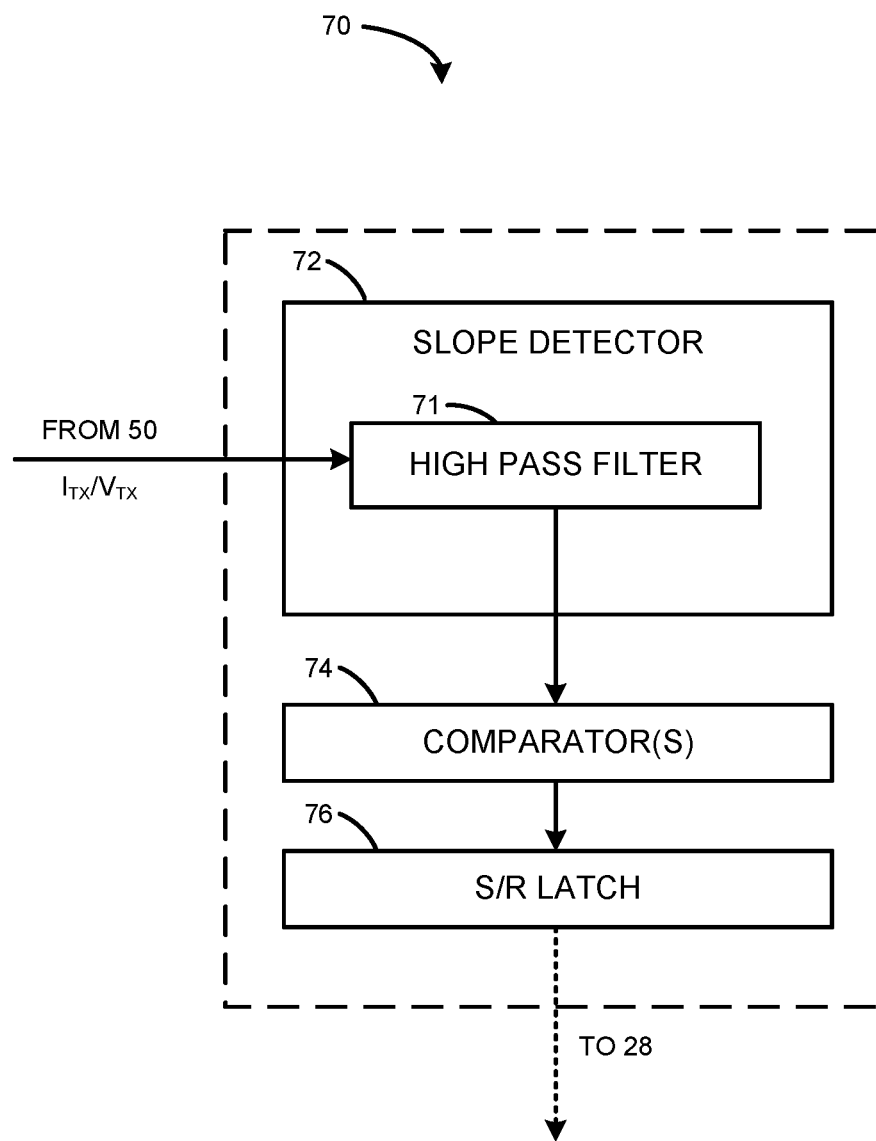
FIG. 6 is a block diagram illustrating components of a demodulation circuit in accordance with the present disclosure.

FIG. 6 is a block diagram for a demodulation circuit 70 for the wireless transmission system 20, which is used by the wireless transmission system 20 to simplify or decode components of wireless data signals of an alternating current (AC) wireless signal, prior to transmission of the wireless data signal to the transmission controller 28. The demodulation circuit includes, at least, a slope detector 72 and a comparator 74. In some examples, the demodulation circuit 70 includes a set/reset (SR) latch 76. In some examples, the demodulation circuit 70 may be an analog circuit comprised of one or more passive components (e.g., resistors, capacitors, inductors, diodes, among other passive components) and/or one or more active components (e.g., operational amplifiers, logic gates, among other active components). Alternatively, it is contemplated that the demodulation circuit 70 and some or all of its components may be implemented as an integrated circuit (IC). In either an analog circuit or IC, it is contemplated that the demodulation circuit may be external of the transmission controller 28 and is configured to provide information associated with wireless data signals transmitted from the wireless receiver system 30 to the wireless transmission system 20.

The demodulation circuit 70 is configured to receive electrical information (e.g., $I_{Tx}$, $V_{Tx}$) from at least one sensor (e.g., a sensor of the sensing system 50), detect a change in such electrical information, determine if the change in the electrical information meets or exceeds one of a rise threshold or a fall threshold. If the change exceeds one of the rise threshold or the fall threshold, the demodulation circuit 70 generates an alert, and, outputs a plurality of data alerts. Such data alerts are received by the transmitter controller 28 and decoded by the transmitter controller 28 to determine the wireless data signals. In other words, the demodulation circuit 70 is configured to monitor the slope of an electrical signal (e.g., slope of a voltage at the power conditioning system 32 of a wireless receiver system 30) and output an alert if said slope exceeds a maximum slope threshold or undershoots a minimum slope threshold.

Such slope monitoring and/or slope detection by the communications system 70 is particularly useful when detecting or decoding an amplitude shift keying (ASK) signal that encodes the wireless data signals in-band of the wireless power signal at the operating frequency. In an ASK signal, the wireless data signals are encoded by damping the voltage of the magnetic field between the wireless transmission system 20 and the wireless receiver system 30. Such damping and subsequent re-rising of the voltage in the field is performed based on an encoding scheme for the wireless data signals (e.g., binary coding, Manchester coding, pulse-width modulated coding, among other known or novel coding systems and methods). The receiver of the wireless data signals (e.g., the wireless transmission system 20) must then detect rising and falling edges of the voltage of the field and decode said rising and falling edges to receive the wireless data signals.

In theory, an ASK signal will rise and fall instantaneously, with no slope between the high voltage and the low voltage for ASK modulation; however, in physical reality, there is some time that passes when the ASK signal transitions from the "high" voltage to the "low" voltage. Thus, the voltage or current signal sensed by the demodulation circuit 70 will have a known slope or rate of change in voltage when transitioning from the high ASK voltage to the low ASK voltage. By configuring the demodulation circuit 70 to determine when an incoming slope meets, overshoots and/or undershoots such rise and fall thresholds, known for the slope when operating in the system 10, the demodulation circuit can accurately detect rising and falling edges of the ASK signal.

Despite the use of slope detection to better separate data signals from noise or other artifacts, accurate data transmission still relies on sufficient coupling between the transmitting antenna and the receiving antenna. To this end, the inductive coupling in a wireless power and data transmission system may be optimized by the transmitter for a given spatial arrangement of the receiver antenna relative to the transmitter antenna. However, when the receiver antenna then moves, due to movement of the peripheral device containing the receiver antenna, the coupling between the transmitting antenna and the receiving antenna may drop.

Degradation in coupling will decrease both power transfer and data transfer efficiency. In the case of a very quick move of the peripheral device, such as may occur with a mouse having a wireless power receiver, the data transfer ability of the system can degrade more quickly than the transmitter's ability to communicate newly optimized coupling parameters to the peripheral device over the wireless connection. In particular, the transmitter may, upon detecting degradation in coupling, generate new operational parameters to account for the new positioning and send such parameters to the receiver for continued optimal power transfer. However, if the coupling is too weak when the new parameters are sent, the receiver will not receive them and will be essentially lost from wireless view. In such circumstances, the data connection may be lost and the peripheral device may cease communications.

As such, it is desirable for the transmitter to be able to compensate for movement of the receiver before there is a substantial impact on wireless data communications between the transmitter and the receiver. To this end, in an embodiment of the disclosed principles, the receiver (e.g., wireless receiver system 30) is configured to determine a rate at which it is moving, and to and to increase or decrease the rate or frequency at which it sends data to the transmitter, for the purposes of controlling power sent and received. For example, received voltage information and coupling parameters may be transmitted to the transmitter, for the purposes of having the transmitter adjust the transmission power rate.

Figure 7A:
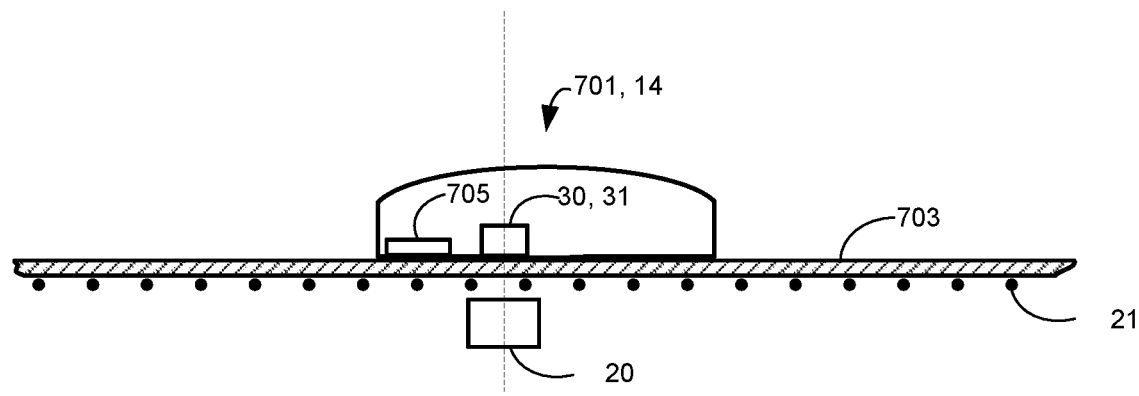
FIG. 7A is a cross-sectional side view of a peripheral device and supporting charging surface in accordance with the present disclosure showing a first relationship between the peripheral device and the supporting charging surface.

In keeping with the principles of the disclosure, FIG. 7A is a simplified side view of a peripheral device 701 (e.g., peripheral device 14) on a surface 703 beneath which lies a wireless transmission system 20. The transmitter antenna 21 may be in the form of a coil extending under a substantial portion of the usable area of the surface 703.

The peripheral device 701 may be the peripheral device 14, within which the wireless receiver system 31 resides. The peripheral device 701 includes a wireless power and data receiver system 30 with antenna 31, and is able to move during use while the wireless transmission system 20 remain fixed.

In an embodiment, the peripheral device 701 also includes a motion sensor 705 which senses movement of the peripheral device 701 in the plane of the surface 703. The motion sensor 705 may be of any type, including an externally referenced type. However, the motion sensor 705 is more preferably of a type not requiring external reference, e.g., an inertial sensor. In some examples, the motion sensor 705 may be an accelerometer configured to detect one or more of a speed, an acceleration, and/or a positioning of an object associated with the motion sensor 705.

In practice, the transmitter antenna 21 does not produce a uniform field, but rather a slightly varying field, especially toward the extremes. Thus, in the illustrated configuration of FIG. 7A, the wireless receiver system 30 receiver system 30 are centered above the transmitter antenna 21 and experience a first coupling coefficient, which may be an optimal coupling coefficient.

Figure 7B:
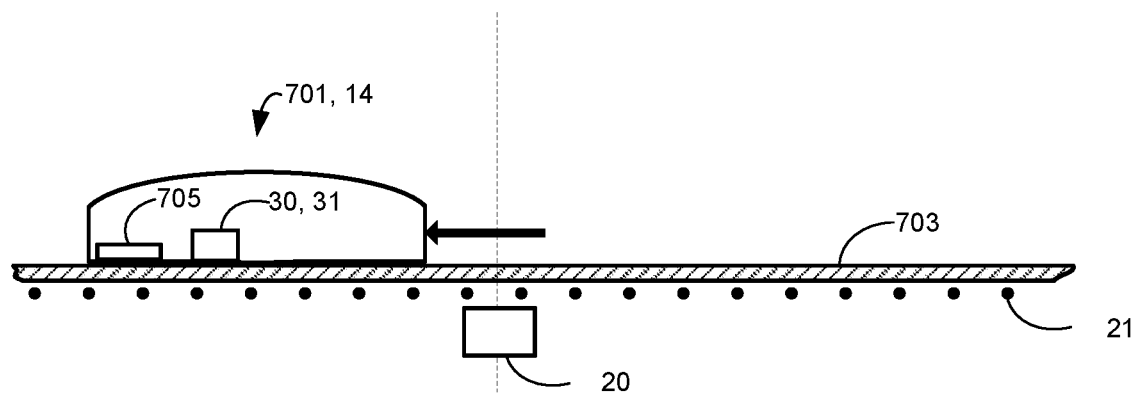
FIG. 7B is a cross-sectional side view of a peripheral device and supporting charging surface in accordance with the present disclosure showing a second relationship between the peripheral device and the supporting charging surface.

However, as the peripheral device 701 moves along the surface 703 during use, the relationship between the wireless receiver system 30 and wireless transmission system 20 changes, as shown in FIG. 7B. In this latter configuration, the wireless receiver system 30 may experience a lower coupling coefficient than that achieved in the configuration of FIG. 7A due to variations in the field generated by the transmitter antenna 21. Nonetheless, efficient power and data transfer will still be possible during such movements provided that the wireless transmission system 20 is able to adjust its operation to compensate, e.g., by increasing or decreasing output power.

However, in order to adjust its operation while the peripheral device 701 and its wireless receiver system 30 are moving, the wireless transmission system 20 must be timely aware of the relocation and consequent change in coupling. Indeed, the faster the position of the peripheral device 701 changes, the more quickly the wireless receiver system 30 must become aware of the movement to efficiently adjust. In an embodiment, this awareness is assisted by receiving more frequent operational updates at the wireless transmission system 20 from the wireless receiver system 30.

To this end, in an embodiment of the disclosed principles, the wireless receiver system 30 detects its acceleration and resolves the detected acceleration to a prescribed update frequency and begins sending updates to the wireless transmission system 20 at the prescribed frequency. In this way, the wireless transmission system 20 need not have even detected a change in coupling before updates start arriving at the new prescribed frequency.

Thus, for example, if the wireless receiver system 30 has been updating the wireless transmission system 20 every 500 ms under initial coupling conditions and then a rapid acceleration of the peripheral device 701 is sensed by the wireless receiver system 30, the wireless receiver system 30 will begin to send more frequent updates to the wireless transmission system 20, e.g., every 10 ms. However, if under the same initial conditions a different slower acceleration of the peripheral device 701 is detected, the wireless receiver system 30 will send slightly less frequent updates to the wireless transmission system 20, e.g., every 250 ms.

To this end, in an embodiment of the disclosed principles, the wireless receiver system 730 comprises a receiver control system such as receiver control system 36, configured to send coupling parameter updates to the wireless power and data transmission system 720 at a frequency that is determined based on movement of the peripheral device 701. In particular, when the wireless receiver system 730 of the peripheral device 701 detects device movement, as indicated by the sensor 705, the wireless receiver system 730 increases the frequency of sending coupling parameter updates to the wireless power and data transmission system 720. In this way, the wireless power and data transmission system 720 may adjust its operation rapidly when device position, and thus coupling coefficient, change rapidly.

In an embodiment, potential detected accelerations are mapped to respective prescribed update rates from the receiver to the transmitter. It will be appreciated that the mapping between detected acceleration and update frequency will be specific to the operating environment of the transmitter and receiver. That is, some systems will have wider lateral ranges over which coupling remains sufficient for good data transfer. For such systems, the increase in frequency with acceleration may be more mild than in systems with narrower lateral operating ranges.

Figure 8:
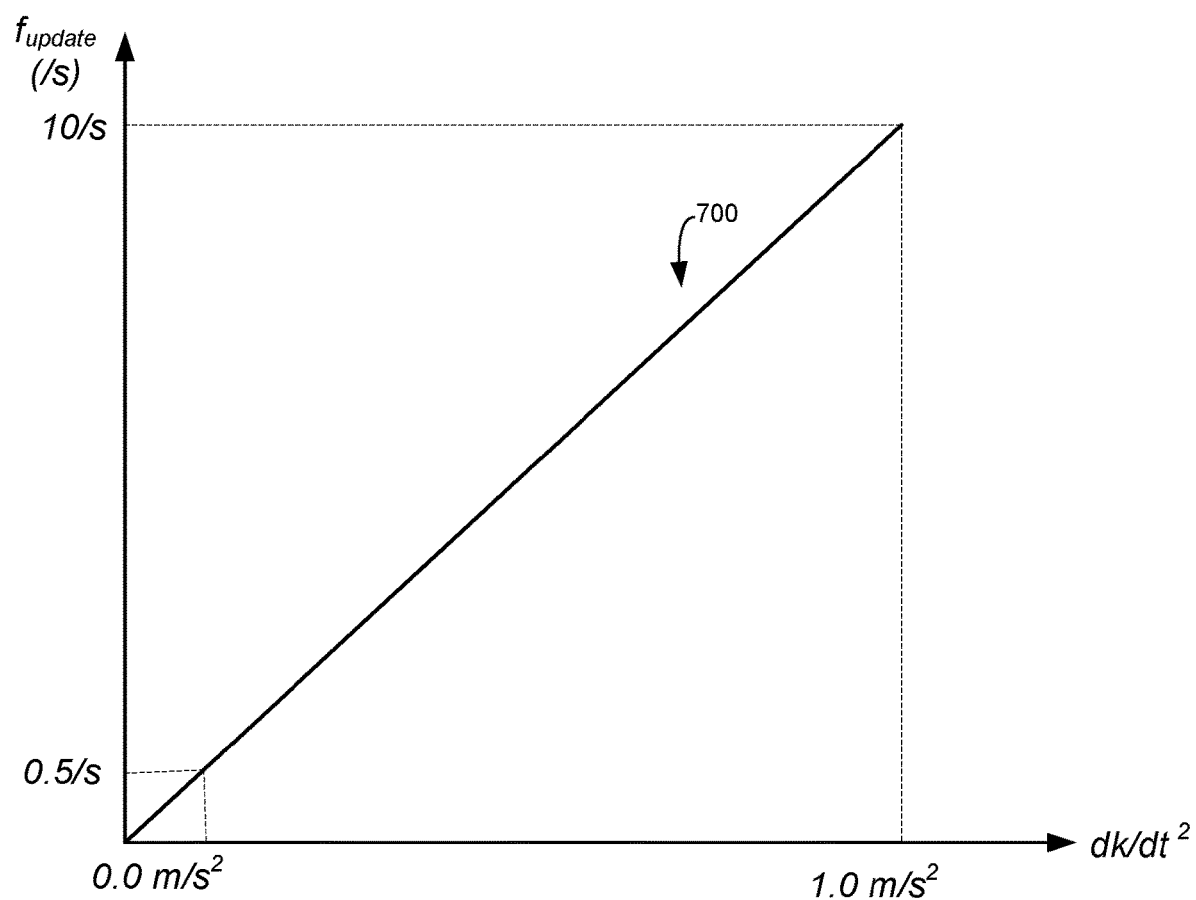
FIG. 8 is an update frequency plot mapping update frequencies to coupling factors in accordance with the present disclosure.

Turning to FIG. 8, an example mapping 700 between potential detected acceleration (in distance per second per second or $dx/ds^2$) and corresponding receiver update frequencies (in units of per second) is shown. As can be seen, the higher the acceleration of the peripheral device 701, the higher the frequency of updates provided by the receiver. While illustrated as a substantially linear relationship between acceleration and frequency of updates, the mapping 700 and/or said relationship may be any direct relationship (e.g., non-linear, exponential, etc.) so long as the frequency of updates increases as the acceleration increases. The mapping of detected acceleration to update frequency may be embodied within the system at production or may be derived by initial calibration when the system is first used.

Figure 9:
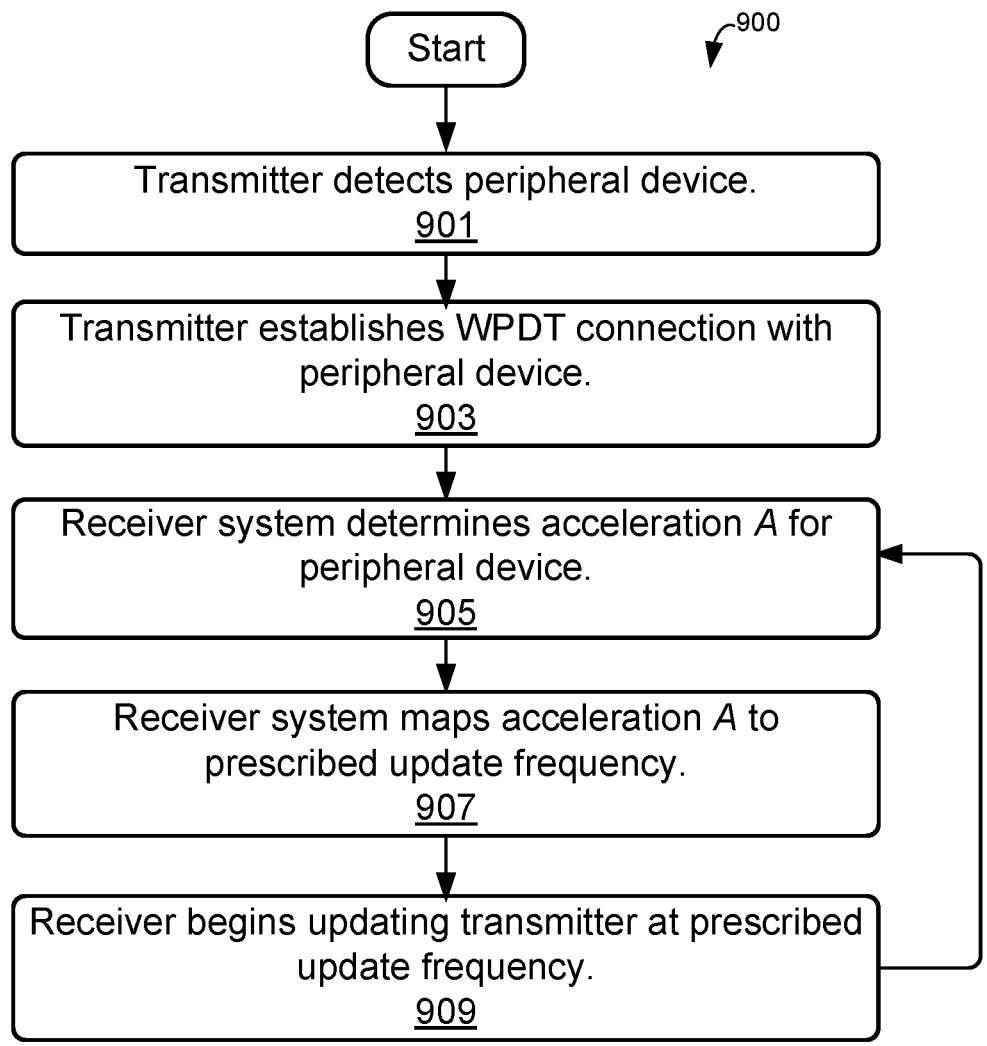
FIG. 9 is a flow chart showing a process of update frequency modification in accordance with the present disclosure.

FIG. 9 shows a flowchart of a process 900 for receiver system 30 and transmitter system 20 operation in accordance with embodiments of the disclosed principles during acceleration of the peripheral device 14. Such a process 900 may be executed, performed, and/or otherwise functioned at or by the transmission controller 27. At stage 901 of the process 900, the transmitter system 20 detects the peripheral device 14, and at stage 903, the transmitter system 20 establishes a wireless power and data transfer (WPDT) connection with the receiver system 30, 31 of the peripheral device 14.

At stage 905, the receiver system 30, 31 of the peripheral device 14 detects via the sensor 705 that the peripheral device 14 is accelerating with an acceleration A. The receiver system 30 of the peripheral device 14 then maps the detected acceleration A to a prescribed update frequency for operational updates from the receiver system 30 of the peripheral device 14 to the transmitter system 20.

At stage 907, the receiver system 30, 31 begins sending operational updates to the transmitter system 20 at the mapped prescribed frequency. While continuing to send operational updates at the mapped prescribed frequency, the receiver system 30 again waits for further detected acceleration (stage 905).

In this way, the transmitter may operate at a level adequate for charging and communications without needing to continually operate at its highest output. This in turn prevents wasted energy and the damage or interruption that can be caused when wasted energy is converted to excess heat.

Figure 10:
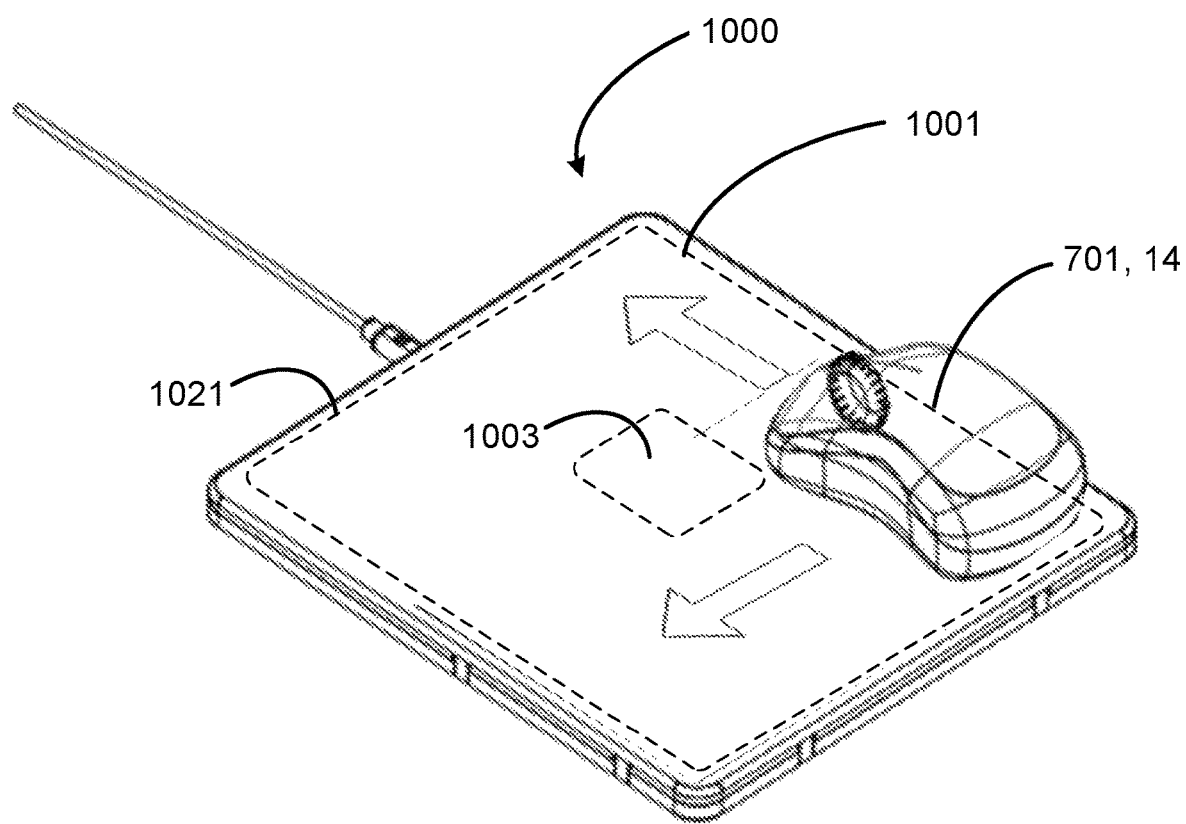
FIG. 10 is a perspective top view of the peripheral device and supporting charging surface in accordance with the present disclosure, showing a location of the peripheral device relative to a charging coil.

Although the disclosed principles may be applied to any number of peripheral device systems, FIG. 10 provides an example of a suitable peripheral environment 1000 within which the disclosed principles may be implemented. FIG. 10 is a perspective top view of a wireless power transfer system, wherein a peripheral device 14, having therein a wireless receiver system such as receiver system 30 and an acceleration sensor 705 (FIG. 7), is positioned to receive AC wireless signals from a wireless transmission system, such as transmitter system 20, within a mouse pad 1001. The vertical projection 1021 of the antenna 21 associated with the transmitter system 20 within the mouse pad 1001 is shown in dashed outline. A smaller area 1003 of optimal coupling is also shown is dashed outline. The wireless transmission system 20 of the mouse pad 1001 is capable of functioning to power or charge the peripheral device 14, even though the peripheral device 14 and its wireless receiver system 30 will generally not remain in the area 1003 of optimal coupling on the mouse pad 1001.

In the context of FIG. 10, the techniques disclosed herein allow for much more efficient operation and greater device longevity in the wireless transmission system of the mouse pad 1001. That is, by managing power based on peripheral device 14 movement, the wireless transmission system of the mouse pad 1001 is able to provide sufficient power without losing coupling through too low of a power setting or wasting energy through too high of a power setting. In the latter case, thermal disruption may occur and associated thermal damage can accumulate. By dynamically changing the frequency of coupling updates from the peripheral device 14 based on movement of the peripheral device, the wireless transmission system of the mouse pad 1001 is able to quickly optimize transmission power in real-time during movement of the peripheral device 14.

This ability is especially valuable during periods of very frequent movement of the peripheral device 14, since in the absence of such frequent updates, the wireless transmission system of the mouse pad 1001 would need to operate at an excessively high transmission power, even in highly coupled configurations, just to ensure sufficient power transmission at the extremes of the movement range of the peripheral device 14. As noted, continually operating at an excess power setting not only wastes electrical power but also overworks components such as diodes, in which wasted energy is converted to heat. This in turn causes operation interruptions due to exceeding thermal limits and causes premature thermal wear in the affected system components.

Figure 11:
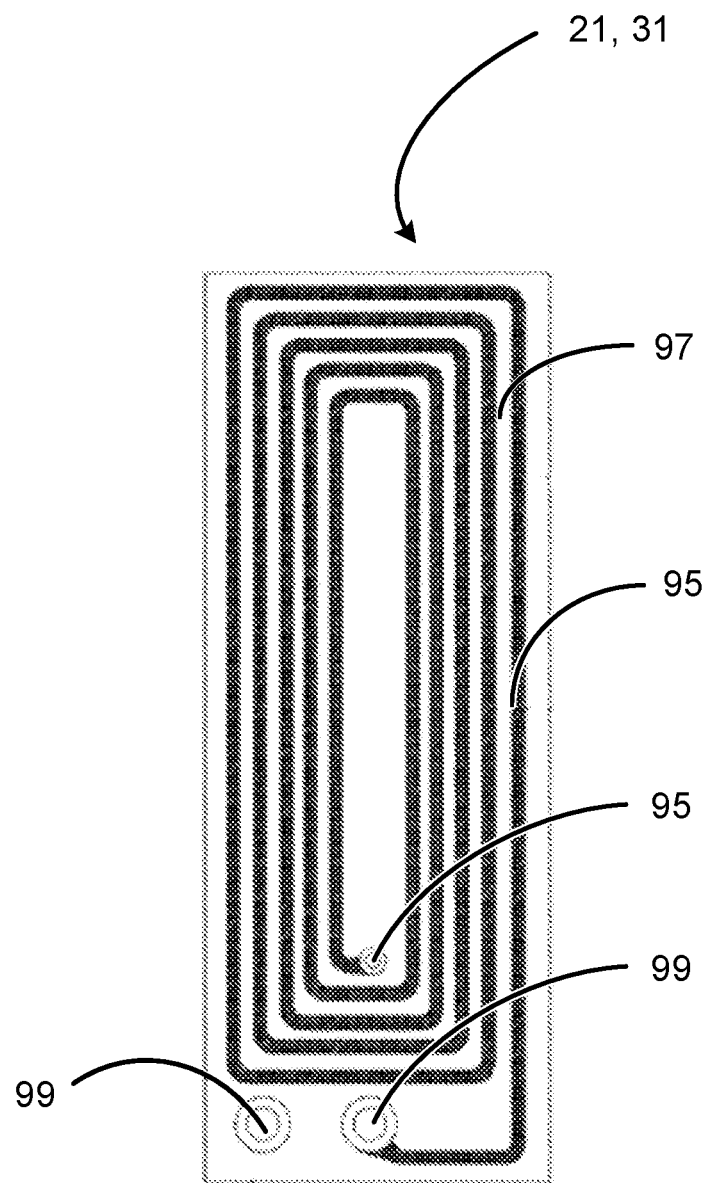
FIG. 11 is a top view of a non-limiting, exemplary antenna, for use as one or both of a transmission antenna and a receiver antenna, in accordance with the present disclosure.

FIG. 11 is a top view of an embodiment of an antenna 21, 31, which may be utilized as a transmission antenna 21 or receiver antenna 31. The antenna 21, 31 includes a plurality of turns 95, with each turn being separated from a prior and/or subsequent turn by a space 97. The outermost turn terminates in a connector 99, and the innermost turn terminates in an inner connector 101, which may be bridged to another outside connector 103. While the antenna 21, 31 is shown to comprise multiple turns, the antenna 21, 31 may be configured, if needed, having only a single turn.

While illustrated as individual blocks and/or components of the wireless power transmitter 20, one or more of the components of the wireless power transmitter 20 may combined and/or integrated with one another as an integrated circuit (IC), a system-on-a-chip (SoC), among other contemplated integrated components. Further, any operations, components, and/or functions discussed with respect to the power transmitter 20 and/or components thereof may be functionally embodied by hardware, software, and/or firmware of the power transmitter 20.

Similarly, while illustrated as individual blocks and/or components of the power receiver 30, one or more of the components of the power receiver 30 may combined and/or integrated with one another as an IC, a SoC, among other contemplated integrated components. To that end, one or more of the components of the power receiver 30 and/or any combinations thereof may be combined as integrated components for one or more of the power receiver 30 and/or components thereof. Further, any operations, components, and/or functions discussed with respect to the power receiver 30 and/or components thereof may be functionally embodied by hardware, software, and/or firmware of the power receiver 30.

The systems, methods, and apparatus disclosed herein are designed to operate in an efficient, stable and reliable manner to satisfy a variety of operating and environmental conditions. The systems, methods, and/or apparatus disclosed herein are designed to operate over a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A wireless power transfer system comprising:
   a wireless transmission system, the wireless transmission system having:
      an input to receive input power from an input power source;
      a transmission antenna; and
      a transmission controller configured to generate wireless signals based, at least in part, on the input power, the wireless signals including wireless power signals and wireless data signals, and to transmit the wireless signals at a transmit power; and
   a wireless receiver system in a wireless peripheral device, the wireless receiver system having:
      a receiver antenna configured to receive the wireless power signals and wireless data signals via inductive coupling with the transmission antenna; and
      a receiver controller configured to detect an acceleration of the wireless peripheral device, generate a prescribed update frequency based on the detected acceleration, and transmit operational updates to the wireless transmission system at the prescribed update frequency, the operational updates configured to alter wireless power transmission in real-time during movement of the wireless peripheral device.

2. The wireless power transfer system of claim 1, wherein the wireless peripheral device includes one or more of a computer input device, a mouse, a keyboard, a tablet computer, a mobile device, an audio device, a headset, headphones, earbuds, a remote control, a recording device, a conference telephonic device, a microphone, a gaming controller, a camera, a stylus, electronic eyewear, or combinations thereof.

3. The wireless power transfer system of claim 1, wherein wireless transmission system is configured to directly power the wireless peripheral device.

4. The wireless power transfer system of claim 1, wherein wireless transmission system is configured to provide electrical power to a load of an electronic device operatively associated with the wireless receiver system, wherein the load is an electrical energy storage device of the wireless peripheral device.

5. The wireless power transfer system of claim 1, wherein the transmission controller is further configured to provide driving signals for driving the transmission antenna, the wireless power transfer system further comprising:
   a power conditioning system configured to receive the driving signals and generate the wireless signals based, at least in part, on the driving signals.

6. The wireless power transfer system of claim 1, further comprising a demodulation circuit configured to receive communications signals from the wireless receiver system and decode the communications signals by determining a rate of change in electrical characteristics of the communications signals.

7. The wireless power transfer system of claim 1, wherein the transmission antenna is configured to operate based on an operating frequency of about 6.78 MHz.

8. The wireless power transfer system of claim 1, wherein the receiver controller is configured to generate the prescribed update frequency based on the detected acceleration by mapping the detected acceleration to the prescribed update frequency based on a predetermined map.

9. A method of wireless power transfer between a wireless transmission system having a transmission antenna and a peripheral device with a wireless receiver system having a receiving antenna, the method comprising:
   generating AC wireless signals including wireless power signals and wireless data signals;
   transmitting the AC wireless signals to the receiver antenna via the transmission antenna to provide power and data to the peripheral device;
   detecting acceleration of the peripheral device at the wireless receiver system;
   generating an update frequency based on the detected acceleration of the peripheral device; and
   transmitting operational updates from the wireless receiver system to the wireless transmission system via the receiving antenna and the transmission antenna at the generated update frequency, the operational updates configured to alter wireless power transmission in real-time during movement of the peripheral device.

10. The method of claim 9, wherein the peripheral device includes one or more of a computer input device, a mouse, a keyboard, a tablet computer, a mobile device, an audio device, a headset, headphones, earbuds, a remote control, a recording device, a conference telephonic device, a microphone, a gaming controller, a camera, a stylus, electronic eyewear, or combinations thereof.

11. The method of claim 9, wherein the AC wireless signals directly power the peripheral device.

12. The method of claim 9, wherein the AC wireless signals provide electrical power to a load of an electronic device operatively associated with the wireless receiver system, wherein the load is an electrical energy storage device of the peripheral device.

13. The method of claim 9, wherein generating the AC wireless signals including the wireless power signals and the wireless data signals further comprises generating driving signals for driving the transmission antenna, and conditioning the driving signals to generate the AC wireless signals based, at least in part, on the driving signals.

14. The method of claim 9, wherein generating the AC wireless signals including the wireless power signals and the wireless data signals further comprises encoding the wireless data signals in the AC wireless signals as modulations in the AC wireless signals.

15. The method of claim 9, wherein the transmission antenna is configured to operate based on an operating frequency of about 6.78 MHz.

16. The method of claim 9, wherein generating the update frequency based on the detected acceleration of the peripheral device further comprises mapping the detected acceleration of the peripheral device to the update frequency based on a predetermined map.

17. A wireless power transfer system comprising:
a wireless transmission system in a surface supporting a peripheral device, the wireless transmission system being configured to transmit power and data via inductive coupling; and
a wireless receiver system within the peripheral device configured to inductively couple with the wireless transmission system to receive the transmitted power and data, detect acceleration of the peripheral device, generate an update frequency based on the detected acceleration of the peripheral device, and transmit operational updates to the wireless transmission system at the generated update frequency via the inductive coupling, the operational updates configured to alter wireless power transmission in real-time during movement of the peripheral device.

18. The wireless power transfer system of claim 17, wherein the wireless receiver system is configured to use the transmitted power to either directly power the peripheral device or provide power to an electrical energy storage device of the peripheral device.

19. The wireless power transfer system of claim 17, wherein the wireless transmission system is configured to operate at an operating frequency of about 6.78 MHz.

20. The wireless power transfer system of claim 17, wherein the wireless receiver system is configured to generate the update frequency based on the detected acceleration of the peripheral device by mapping the detected acceleration to the update frequency based on a predetermined map.

* * * * *